US012589438B2

(12) United States Patent
Haimer

(10) Patent No.: US 12,589,438 B2
(45) Date of Patent: Mar. 31, 2026

(54) APPARATUS FOR COOLING AND/OR DRYING A SHRINK CHUCK AND METHOD FOR COOLING AND/OR DRYING A TOOL HOLDER, IN PARTICULAR A SHRINK CHUCK

(71) Applicant: Haimer GmbH, Hollenbach-Igenhausen (DE)

(72) Inventor: Franz Haimer, Hollenbach-Igenhausen (DE)

(73) Assignee: Haimer GmbH, Hollenbach-Igenhausen (DE)

( * ) Notice: Subject to any disclaimer, the term of this patent is extended or adjusted under 35 U.S.C. 154(b) by 489 days.

(21) Appl. No.: 18/328,031

(22) Filed: Jun. 2, 2023

(65) Prior Publication Data

US 2023/0390831 A1    Dec. 7, 2023

(30) Foreign Application Priority Data

Jun. 2, 2022    (DE) ..................... 10 2022 114 046.6

(51) Int. Cl.
B23B 31/117 (2006.01)

(52) U.S. Cl.
CPC ................................ B23B 31/1179 (2013.01)

(58) Field of Classification Search
CPC ...... B23B 31/1179; F26B 5/08; F26B 21/004; F26B 21/006; F26B 21/04; B23P 11/027
See application file for complete search history.

(56) References Cited

U.S. PATENT DOCUMENTS

| | | | |
|---|---|---|---|
| 9,636,788 B2 | 5/2017 | Haimer | |
| 11,141,797 B2 | 10/2021 | Haimer | |
| 2005/0204552 A1* | 9/2005 | Steudte .................... | H05B 6/42 |
| | | | 29/800 |
| 2013/0212899 A1* | 8/2013 | Haimer ................... | F26B 25/06 |
| | | | 34/239 |

FOREIGN PATENT DOCUMENTS

| | | | | | |
|---|---|---|---|---|---|
| CN | 212288372 U | * | 1/2021 | | |
| DE | 10025004 A1 | * | 11/2001 | ......... | B23B 31/1179 |
| DE | 102005024766 A1 | * | 11/2006 | ........... | B23P 11/027 |
| DE | 102010033160 A1 | | 2/2012 | | |
| DE | 102010034869 A1 | * | 2/2012 | ........... | B23P 11/027 |
| DE | 102012002596 A1 | | 8/2013 | | |
| DE | 102017118643 A1 | | 2/2019 | | |

(Continued)

*Primary Examiner* — Frantz F Jules
(74) *Attorney, Agent, or Firm* — Laurence A. Greenberg; Werner H. Stemer; Ralph E. Locher

(57) ABSTRACT

An apparatus cools and/or dries a shrink chuck and a method cools and/or dries a tool holder. The apparatus has a cooling attachment which can be fitted over the shrink chuck with the lower end thereof. In the region of the lower end of the cooling attachment guiding elements are arranged such that a first cooling fluid flow can be guided into an interior, which can receive the shrink chuck, of the cooling attachment while producing a turbulent flow which can be brought about by the guiding elements. In the method, the tool holder is dried and/or cooled by a first cooling fluid flow from a first cooling fluid. The first cooling fluid flow flows in the form of a turbulent flow axially in the direction of a tool receiving opening of the tool holder along the tool holder.

32 Claims, 6 Drawing Sheets

(56)         References Cited

FOREIGN PATENT DOCUMENTS

DE        102017125718  A1      5/2019
EP            1470888  A1  *  10/2004    ............ B23P 11/027
JP          2008534292  A  *   8/2008    ........ B23Q 11/1023
WO    WO-2013120821  A1  *   8/2013    .............. H05B 6/40
WO    WO-2015099259  A1  *   7/2015    ............ B23P 11/027

* cited by examiner

APPARATUS FOR COOLING AND/OR DRYING A SHRINK CHUCK AND METHOD FOR COOLING AND/OR DRYING A TOOL HOLDER, IN PARTICULAR A SHRINK CHUCK

CROSS-REFERENCE TO RELATED APPLICATION

This application claims the priority, under 35 U.S.C. § 119, of German Patent Application DE 10 2022 114 046.6, filed Jun. 2, 2022; the prior application is herewith incorporated by reference in its entirety.

FIELD AND BACKGROUND OF THE INVENTION

The invention relates to an apparatus for cooling and/or drying a shrink chuck and a method for cooling and/or drying a tool holder, in particular a shrink chuck, in particular by means of such an apparatus.

Published, non-prosecuted German patent application DE 10 2012 002 596 A1, corresponding to U.S. Pat. No. 9,636,788, discloses an apparatus for cooling and/or drying a shrink chuck.

The cooling apparatus disclosed therein contains a cooling attachment, over which there can be fitted a shrink chuck which is intended to be cooled. The cooling attachment provides for an (inner) insert, in this case an inner sleeve, which has upwardly directed inlet openings for a cooling fluid or a cooling fluid flow of a cooling fluid, for example, in this instance blast air, into an interior, which can receive the shrink chuck, of the cooling attachment.

Furthermore, the cooling apparatus provides for a discharge device having a discharge pipe which is arranged on the upper side of the cooling attachment and a suction line which is connected to at least one discharge unit.

In this cooling apparatus, the cooling attachment is not completely placed on the shrink chuck when the shrink chuck is cooled, whereby additional cooling fluid can also be introduced into the interior of the cooling attachment via a gap between the lower end of the cooling attachment and the shrink chuck.

Thus, an upwardly directed cooling fluid flow can be produced via the discharge device inside the cooling attachment, by which the cooling fluid which is introduced into the interior of the cooling attachment through the upwardly directed inlet openings and the additional cooling fluid, which is introduced into the interior of the cooling attachment through the gap, can be discharged upward and a cooling fluid can be prevented from flowing away downward.

The drawn-in cooling fluid flow passes on its path inside the cooling attachment upward over a clamping region of the shrink chuck and cools and/or dries it.

Published, non-prosecuted German patent application DE 10 2017 118 643 A1, corresponding to U.S. Pat. No. 11,141,797, discloses another apparatus which develops the cooling apparatus which is known from published, non-prosecuted German patent application DE 10 2012 002 596 A1, corresponding to U.S. Pat. No. 9,636,788, for cooling and/or drying a shrink chuck.

In this cooling apparatus, the insert also provides—in addition to the upwardly directed inlet openings—downwardly directed inlet openings for a cooling fluid or a cooling fluid flow of a cooling fluid, for example, in this instance liquid cooling fluid, into the interior, which can receive the shrink chuck, of the cooling attachment, which openings are arranged—on the insert—above the upwardly directed inlet openings.

Furthermore, in this cooling apparatus the cooling attachment has an outer housing and an inner housing which is arranged in the outer housing, wherein the insert is thus then arranged in the inner housing.

An annular chamber, by means of which an additional cooling fluid or a cooling fluid flow of an additional cooling fluid, for example, in this instance blast air, can be directed to the lower end of the cooling attachment and can be redirected at that location, is constructed between the outer housing and the inner housing, where it can flow from there directly into the interior of the cooling attachment.

In this cooling apparatus, the cooling attachment is placed completely with the lower end thereof without gaps on the shrink chuck during cooling and/or drying of the shrink chuck, whereby no other additional cooling fluid can be introduced (without any control) into the interior of the cooling attachment via the gap between the lower end of the cooling attachment and the shrink chuck.

In this instance, it is thus also possible to produce an upwardly directed cooling fluid flow via the discharge device inside the cooling attachment, by which the cooling fluids which are introduced into the interior of the cooling attachment through the upwardly and downwardly directed inlet openings and the additional cooling fluid which is introduced from the annular chamber at the lower end of the cooling attachment directly into the interior of the cooling attachment are discharged upward.

In this instance, the drawn-in cooling fluid flow also passes on its path inside the cooling attachment upwardly over a clamping region of the shrink chuck and cools and/or dries it.

SUMMARY OF THE INVENTION

An object of the invention is to improve the cooling apparatuses which are known in the prior art for cooling and/or drying a shrink chuck, in particular to increase the cooling power thereof.

The object is achieved by an apparatus for cooling and/or drying a shrink chuck and a method for cooling and/or drying a tool holder, in particular a shrink chuck, in particular by means of such an apparatus, having the features of the respective independent claim.

Advantageous developments of the invention are set out in the dependent claims and the following description and relate both to the apparatus according to the invention and to the method according to the invention.

Where applicable, terms used, such as top, bottom, front, rear, left or right are intended to be understood—unless explicitly defined otherwise—in accordance with usual comprehension—including when observing the present figures. Terms such as radial and axial are intended to be understood—if used and unless explicitly defined otherwise—in relation to center axes or axes of symmetry of members/components which are described herein—including when observing the present figures.

The term "substantially"—if used—can (in accordance with the understanding of the Supreme Court) be understood in that it refers to "a degree which is practically still considerable". Possible deviations, which are implied by this terminology, from the exact can thus be produced unintentionally (that is to say, without any functional reasoning) as a result of production or assembly tolerances or the like.

Furthermore, if cooling by means of a cooling fluid or a cooling fluid flow is mentioned, a drying can also always also be brought about—in the case of a "dry" cooling fluid, that is to say, a fluid which does not have any moisture portions and/or liquid portions. For example, the "dry" (blast) air blows off liquid residues on the object.

The apparatus for cooling and/or drying a shrink chuck has a cooling attachment which can be fitted over the shrink chuck with the lower end thereof.

In a manner expressed in simplified and descriptive terms, the cooling attachment can be fitted over the shrink chuck with a fitting opening which is located at the lower end thereof.

The apparatus further provides hi the region of the lower end of the cooling attachment for guiding elements, in particular guiding vanes, which are constructed in such a manner that a first cooling fluid flow (of a first cooling fluid, for example, a (blast) air or a water/air admixture or a cooling liquid) can be guided into an interior, which can receive the shrink chuck, of the cooling attachment while producing a turbulent flow which can be brought about by the guiding elements.

It is particularly advantageous to arrange the guiding elements or guiding vanes, in particular in a uniformly distributed manner, so as to extend round the lower end of the cooling attachment or n the region of the "fitting opening" there.

In order to bring about or to form the turbulent flow, it is also advantageous if the guiding elements or the guiding vanes are constructed in a curved manner, similarly to turbine blades.

In a manner expressed in simplified and descriptive terms, the guiding elements or the guiding vanes are similar to a guiding apparatus in a turbine. The curved shape of such guiding elements or guiding vanes can thus direct or redirect a or the first cooling fluid flow and thus allow the turbulence of the turbulent flow to be produced.

The invention is based on the recognition that, in a shrink chuck which is intended to be cooled and which is subjected to flow by a turbulent flow, there is a (an increased) mixing of the cooling fluid as a result of the (non-laminar) turbulent flow (whereby static, warm cooling fluid layers are broken up), which results in an increased cooling power.

Furthermore, a cooling fluid which flows in a swirl around the shrink chuck which is intended to be cooled or a cooling fluid flow which flows in a swirl round the shrink chuck which is intended to be cooled passes over a greater surface-area on the shrink chuck which is intended to be cooled, which can also contribute to an increased cooling (and/or drying) of the shrink chuck.

Tests have shown that—as a result of the increased cooling power which can be achieved by the invention—up to 50% shorter cooling times can be achieved with a shrink chuck, which is intended to be cooled, than with conventional apparatuses without the turbulent flow provided according to the invention.

There may preferably also be provision for the cooling attachment to have an outer housing and an inner housing which is arranged in the outer housing, wherein between the outer housing and the inner housing an annular chamber, in particular an incompletely circumferential annular chamber, in particular for the first cooling fluid flow, is constructed.

Such an annular chamber may be particularly advantageous in order to distribute a cooling fluid flow or a cooling fluid in a radially uniform manner "over a wide area".

Via this annular chamber in the cooling attachment, a cooling fluid flow or a cooling fluid can thus be guided similarly to the first cooling fluid flow or the first cooling fluid to the lower end of the cooling attachment and redirected there via the guiding elements or guiding vanes, where it can then flow directly from that location into the interior of the cooling attachment, forming the turbulent flow.

To this end, it may also be advantageous if the guiding elements are arranged or formed on an inner housing of the cooling attachment, in particular integrally, whereby flow-guiding flow regions/spaces can thus be formed between the guiding elements and covered at both sides by the inner housing and the outer housing or a (lower) cover which is connected, in particular screwed, to the outer housing.

If a cooling fluid flow or a cooling fluid, such as the first cooling fluid flow or the first cooling fluid, thus flows through these flow regions/spaces (at the lower end of the cooling attachment), it is redirected at that location via the guiding elements or guiding vanes and flows from there directly into the interior of the cooling attachment, forming the turbulent flow.

Furthermore, the cooling apparatus can have a discharge device, in particular having a discharge pipe and/or suction line which is arranged at an upper end of the cooling attachment or in a particularly advantageous manner on the inner housing or the upper end thereof. The suction pipe or the suction line can then be connected to at least one discharge unit.

An upwardly directed cooling fluid flow, by which the cooling fluids which are introduced into the interior of the cooling attachment, can thus be produced inside the cooling attachment via the discharge device, and in particular the first cooling fluid flow or first cooling fluid which is introduced—where applicable from the annular chamber which can be provided—via the guiding elements at the lower end of the cooling attachment—forming the turbulent flow into the interior of the cooling attachment on a helical path or with helically swirling movement—can be discharged upwardly.

It may further also be advantageous, particularly with or in the discharge device, to also provide a drying and/or cleaning device, with which humid cooling fluid which is discharged where applicable can be dried and/or cleaned.

Such a drying and/or cleaning device is the subject-matter of published, non-prosecuted German patent application DE 10 2017 125 718 A1 which is hereby incorporated in this application by reference.

If the discharged, where applicable dried and/or cleaned cooling fluid flow or cooling fluid is then supplied to the cooling attachment or the annular chamber of the cooling attachment and the guiding elements of the cooling attachment or the flow spaces between the guiding elements (again), an efficient, closed cooling circuit can thus be formed.

There may further also be provision for the cooling attachment to have an inner insert, in particular an inner insert which is arranged in the inner housing.

In this instance, it is then particularly advantageous if there is/are constructed between the insert and the inner housing a first annular space, in particular for a second cooling fluid flow (from a second cooling fluid) and/or second annular space, in particular for a third cooling fluid flow (from a third cooling fluid).

Such an annular space—similarly to the annular chamber—can be particularly advantageous in order to distribute a cooling fluid flow or cooling fluid in a radially uniform manner "over a wide area".

It is also advantageous if such a first and/or second annular space is further also sealed by means of seals "outward" and also with respect to each other.

It is further advantageous if the insert, in particular in the lower region thereof, has first upwardly directed inlet opening(s) (for introducing or supplying a cooling fluid flow or a cooling fluid into the interior of the cooling attachment) for a second cooling fluid flow (from a or the second cooling fluid, for example, a water/air admixture or also (only) (blast) air) and/or, in particular in the upper region thereof, second downwardly directed inlet opening(s) (for introducing or supplying a cooling fluid flow or a cooling fluid inside the cooling attachment) for a third cooling fluid flow (from a or the third cooling fluid, for example, (blast) air, where applicable also a water/air admixture.

It can thereby be brought about that the second cooling fluid from the first annular space is introduced via these first inlet openings into the interior of the cooling attachment or that the third cooling fluid from the second annular space is introduced via these second inlet openings into the interior of the cooling attachment.

Such inlet openings can advantageously be in the form of nozzles.

It may also be advantageous to allow a cooling fluid or the second and/or third cooling fluid to be introduced into the interior of the cooling attachment under pressure through the inlet opening(s). Corresponding provisions may also be made for the first cooling fluid of the first cooling fluid flow.

In a development, there may also further be provision for a sealing element, in particular a sealing lip and/or a sealing lobe, to be arranged in the region of the lower end of the cooling attachment for sealing abutment against the shrink chuck.

Without any sealing element, the seal can also be achieved by gap-free positioning of the cooling attachment with the lower end thereof.

If the cooling attachment—during cooling of the shrink chuck—is completely positioned on the shrink chuck, in particular then by means of the sealing element, an otherwise present gap between the lower end of the cooling attachment and the shrink chuck is sealed—and no other cooling fluid can be introduced into the interior of the cooling attachment (in an uncontrolled manner with associated high noise generation) via the gap between the lower end of the cooling attachment and the shrink chuck.

There may also further be provision for one or more holes which connect(s) a or the first annular space to a or the flow space or the flow spaces in the region of the guiding elements, in particular between the guiding elements, in technical fluid terms, to be arranged in an inner housing of the cooling attachment. In particular, the one or more holes in the cooling attachment can generally be used to produce a fluid-technical connection to these flow regions/spaces at that location—in a flow direction upstream of the guiding elements.

The cooling attachment may also have one or more supply lines, through which a cooling fluid can be supplied into a or the flow space(s) in the region of the guiding elements, in particular between the guiding elements and/or in a flow direction upstream of the guiding elements.

These holes and/or supply lines can particularly advantageously be used to allow different cooling fluid flows—in a flexible manner—to be introduced via different flow paths into the interior of the cooling attachment.

It is also advantageous if one or more stop elements, which is/are able to stop against the shrink chuck, is/are arranged on the cooling attachment.

By means of such a stop element, a fitting depth in the shrink chuck which is intended to be cooled can be adjusted or—in the case of narrow and/or long shrink chucks which are intended to be cooled—the cooling attachment which is fitted over such a shrink chuck can be prevented from being fitted over the shrink chuck which is intended to be cooled in an uncontrolled manner and/or too far, because there is no reachable support, for example, on a collar of the shrink chuck.

In a development, there may also be provision for the cooling attachment to have one or the insert, which is in particular arranged in an or the inner housing of the cooling insert, wherein the insert is arranged in the cooling attachment or in the inner housing so as to be able to be rotated or pivoted about the longitudinal axis thereof.

If the insert further also has, in particular in the lower region thereof, first or the first upwardly directed inlet openings for a or the second cooling fluid How and/or in particular in the lower region thereof second or the second downwardly directed inlet openings for a or the third cooling fluid flow, the second and/or third cooling fluid flow can also then be caused to flow in a turbulent manner by such a rotatable or pivotable insert.

The pivotability or rotatability of the insert can be achieved actively, for example, by means of a drive, or passively, for example, by means of guiding elements.

The same effect of "turbulent" second and/or third cooling fluid flow or second and/or third cooling fluid can also be achieved if it/they is/are"carried along" by the turbulent flow of the first cooling fluid flow, with corresponding movement.

Irrespective of the shrink chuck which is described here, the apparatus may also be suitable for cooling other types of tool holders, such as, for example, hydraulic clamping chucks, collet chucks, and the like, if there may be a corresponding need under given circumstances.

In specific cases, it may also be sufficient to dispense with the cooling effect of the apparatus and only to use the drying effect. This may be the case, for example, when a tool holder is wet after use, but not hot, and is intended only to be dried before being stored.

In the method for cooling and/or drying a tool holder, in particular a shrink chuck, in particular by means of the apparatus according to the invention, the tool holder is cooled and/or dried by a first cooling fluid flow (from a first cooling fluid).

In this case, there is provision in the method for the first cooling fluid flow to flow in the form of a turbulent flow axially in the direction of a tool receiving opening of the tool holder along the tool holder.

In a manner expressed in simplified and descriptive terms, the first cooling fluid flow or the first cooling fluid flows over a helical path or with a helically turbulent movement axially in the direction of a tool receiving opening of the tool holder along the tool holder.

The invention is based on the recognition that in a shrink chuck which is intended to be cooled and which is subjected to flow by a turbulent flow, there is a (an increased) mixing of the cooling fluid as a result of the (non-laminar) turbulent flow (whereby static, warm cooling fluid layers are broken up), which results in an increased cooling power.

Furthermore, a cooling fluid which flows around the shrink chuck which is intended to be cooled in a turbulent manner or a cooling fluid flow which flows round the shrink chuck which is intended to be cooled in a turbulent manner flows over a greater surface-area on the shrink chuck which is intended to be cooled. There are also included regions which would otherwise be in the "wind shadow", which can also contribute to increased cooling (and/or drying) of the shrink chuck.

There may further be provision in a development for the tool holder to be cooled and/or dried by a second cooling fluid flow from a second cooling fluid, wherein the tool holder is blown on by the second cooling fluid flow in the form of a flow which is directed axially in the direction of the tool receiving opening of the tool holder or which is directed upwardly (in a manner expressed in simplified and descriptive terms).

The second cooling fluid flow—for example, where applicable instead of being subjected to blowing or after being subjected to blowing axially counter to the direction of the tool receiving opening of the tool holder or downward—can also flow in the form of a or the turbulent flow axially in the direction of the tool receiving opening of the tool holder or (in a manner expressed in simplified and descriptive terms) upwardly along the tool holder.

It also appears to be advantageous if the tool holder is cooled and/or dried by a third cooling fluid flow from a third cooling fluid, wherein the tool holder is blown on by the third cooling fluid flow in the form of a flow which is directed axially counter to the direction of the tool receiving opening of the tool holder or which is directed downwardly (in a manner expressed in simplified and descriptive terms).

Where applicable, there may also be provision here for the third cooling fluid flow in the form of a or the turbulent flow to also flow axially in the direction of the tool receiving opening of the tool holder or (in a manner expressed in simplified and descriptive terms) upwardly along the tool holder, for example, where applicable instead of being subjected to flow or after being subjected to flow axially counter to the direction of the tool receiving opening of the tool holder or downward.

There may also further be provision for a first, second and/or third or the first, second and/or third cooling fluid of a or the first, second and/or third cooling fluid flow to be (blast) aft or a gas, such as, for example, $CO_2$, or a water/air admixture, for example, in the form of a (cooling) mist, or a water/gas admixture or an air/gas admixture, in particular for the first cooling fluid of the first cooling fluid flow to be (blast) aft, in particular—where applicable dried—air and/or for the second cooling fluid of the second cooling fluid flow to be a water/air admixture or (blast) aft and/or for the third cooling fluid of the third cooling fluid flow to be (blast) air.

Cooling fluids having liquid portions, such as water/air admixtures, can increase the cooling power; "dry" cooling fluids, such as "pure" (blast) air, have the effect of also drying.

Where applicable, a or the cooling fluid(s) can be pressurized or be blown in under pressure, for example, at approximately 6 bar.

Furthermore, it may also be advantageous if, in a fluid admixture, such as the water/air admixture, the ratio of the components or the ratio of water and air is adaptable, for example, for a corresponding metering of the components or water and air to be carried out—in a controlled manner—at the desired ratio. There may further be provision for the droplet size of the added fluid, in particular water, to be adjusted.

In a development, there may also be provision for the tool holder to be cooled and/or dried in several phases, in particular for, in a first phase of cooling and/or drying of the tool holder, the tool holder to be cooled by means of the first cooling fluid flow and a or the second cooling fluid flow, and for, in a second phase of cooling and/or drying of the tool holder, the tool holder to be cooled and/or dried at least by means of the first cooling fluid flow and a or the third cooling fluid flow.

In this case, there may also further be provided in a development that, in the second phase of the cooling and/or drying of the tool holder, the tool holder is cooled and/or dried by means of a or the second cooling fluid flow.

This drying in the second phase of the cooling of the tool holder can particularly be carried out in that the corresponding cooling fluid—at least during drying in the second phase—does not have any moisture or liquid portions, for example, it is "pure" (blast) air.

Other, different cooling and/or drying methods can be carried out, for example, by several cooling and/or drying phases, wherein the different cooling fluid flows are combined differently and/or are carried out with different cooling fluids.

It may also be advantageous if the first cooling fluid flow and a or the second cooling fluid flow are mixed and/or combined before the tool holder is subjected to flow, whereby the second cooling fluid flow also flows against the tool holder in a turbulent flow.

It may be found to be particularly advantageous if the second cooling fluid of the second cooling fluid flow in the first phase is a water/air admixture—and thus brings about a high cooling power at that location—and/or if the second cooling fluid of the second cooling fluid flow in the second phase is (blast) air—and thus has drying efficiency at that location.

In a development, there may also be provision for at least one of the cooling fluid flows to be supplied to the tool holder under pressure, for example, 6 bar, in particular for a or the second cooling fluid flow to be supplied to the tool holder under pressure at least in the case of a water/air admixture.

It also appears to be advantageous for the first cooling fluid flow (which flows against and around the tool holder) to be discharged or the fluid flows, particularly all the fluid flows, which flow against the tool holder, to be discharged, in particular by means of a discharge unit or a or the discharge device.

In a development, it also appears in this instance to be advantageous if the discharged first cooling fluid flows) is/are also dried and/or cleaned and the dried and/or cleaned cooling fluid flow(s) is/are supplied again to the cooling process (and/or an additional drying process) of the tool holder, in particular as the first "turbulent" cooling fluid flow.

Such a drying and/or cleaning operation is set out in published, non-prosecuted German patent application DE 10 2017 125 718 A1, which is hereby incorporated in this application by reference.

There may also be provision for a or the second cooling fluid flow and/or a or the third cooling fluid flow also to be caused to flow in a turbulent manner, for example, by a rotatable or pivotable insert in a cooling attachment which can be fitted over the tool holder—or, for example, simply in that it/they is/are "carried along" by the turbulent flow of the first cooling fluid flow—in a corresponding then receiving movement.

The previously given description of advantageous embodiments of the invention contains a number of features which are reproduced in the individual dependent claims in a state sometimes combined together. However, these features can advantageously also be considered individually and are combined to form other advantageous combinations—also between the arrangements/apparatuses and methods.

Even if in the description or the patent claims a number of terms are used in the singular or in conjunction with a numeral, the scope of the invention for these terms is not intended to be limited to the singular or the respective numeral. Furthermore, the words "a" or "an" are not intended to be understood to be numerals, but instead to be indefinite articles.

The above-described properties, features and advantages of the invention and the way in which they are achieved will become clearer and more easily understandable in connection with the following description of the embodiments of the invention which are explained in greater detail in connection with the drawing(s)/fig (the same members/components and functions have the same reference numerals in the drawing(s)/figure(s)).

The embodiments serve to explain the invention and do not limit the invention to the feature combinations set out therein, including not in relation to functional features. Furthermore, suitable features of any embodiment can also be considered explicitly in isolation, removed from an embodiment, inserted into another embodiment in order to supplement it and/or combined with any of the claims.

When reading the claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B.

Other features which are considered as characteristic for the invention are set forth in the appended claims.

Although the invention is illustrated and described herein as embodied in a apparatus for cooling and/or drying a shrink chuck and method for cooling and/or drying a tool holder, in particular a shrink chuck, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly to FIGS. 1-6 thereof, each shows an apparatus 2 for cooling and/or drying a shrink chuck 4 or significant portions thereof, wherein particularly FIGS. 2 to 5 also explain procedural aspects of the apparatus 2 (during the cooling and/or drying of a shrink chuck), in two embodiments.

Figure 2:
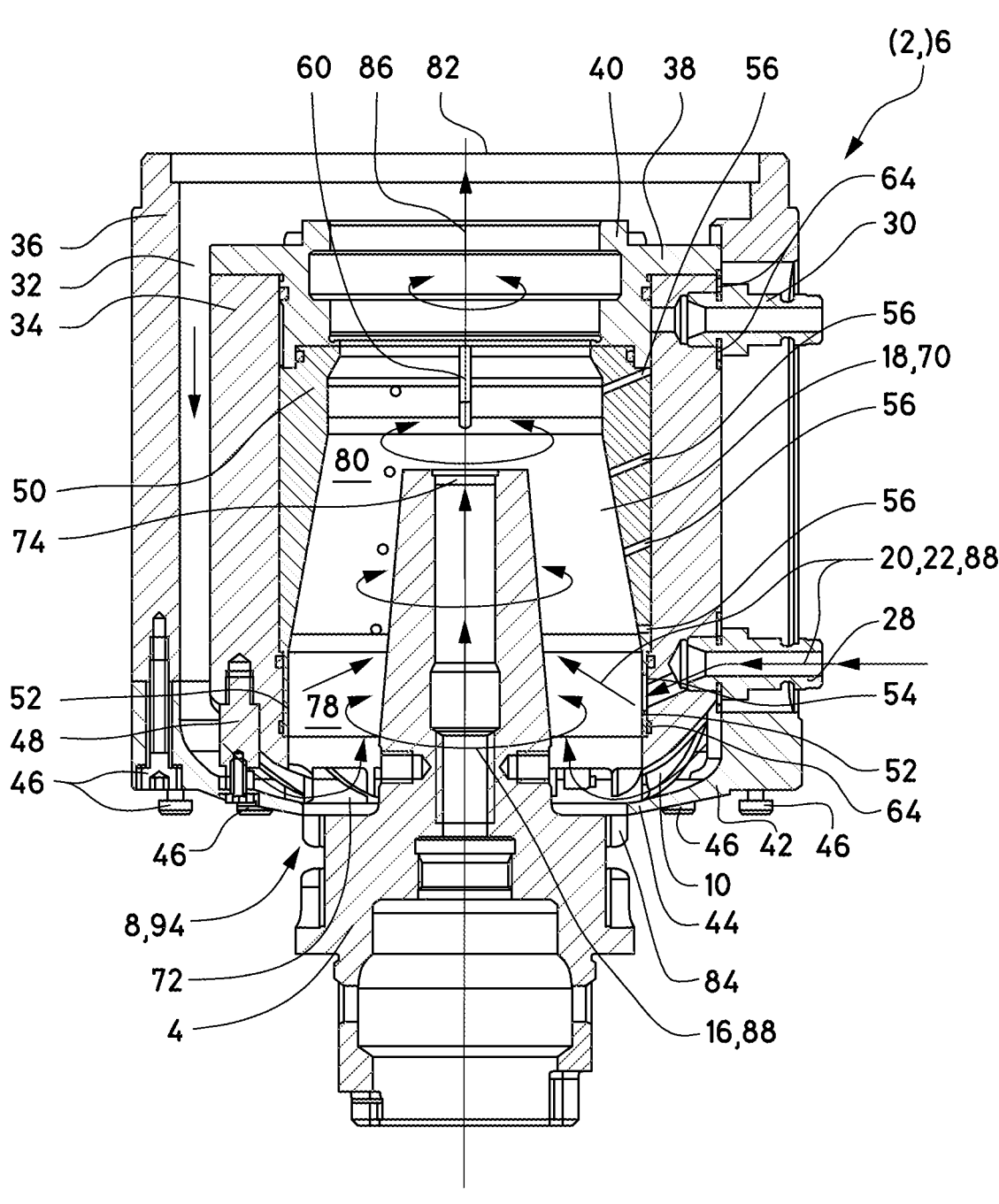
FIG. 2 is a sectional view of a cooling attachment of the apparatus for cooling and/or drying a shrink chuck from FIG. 1, which explains a first phase of a cooling process of a shrink chuck, which is received in the cooling attachment, according to a first embodiment.
Figure 3:
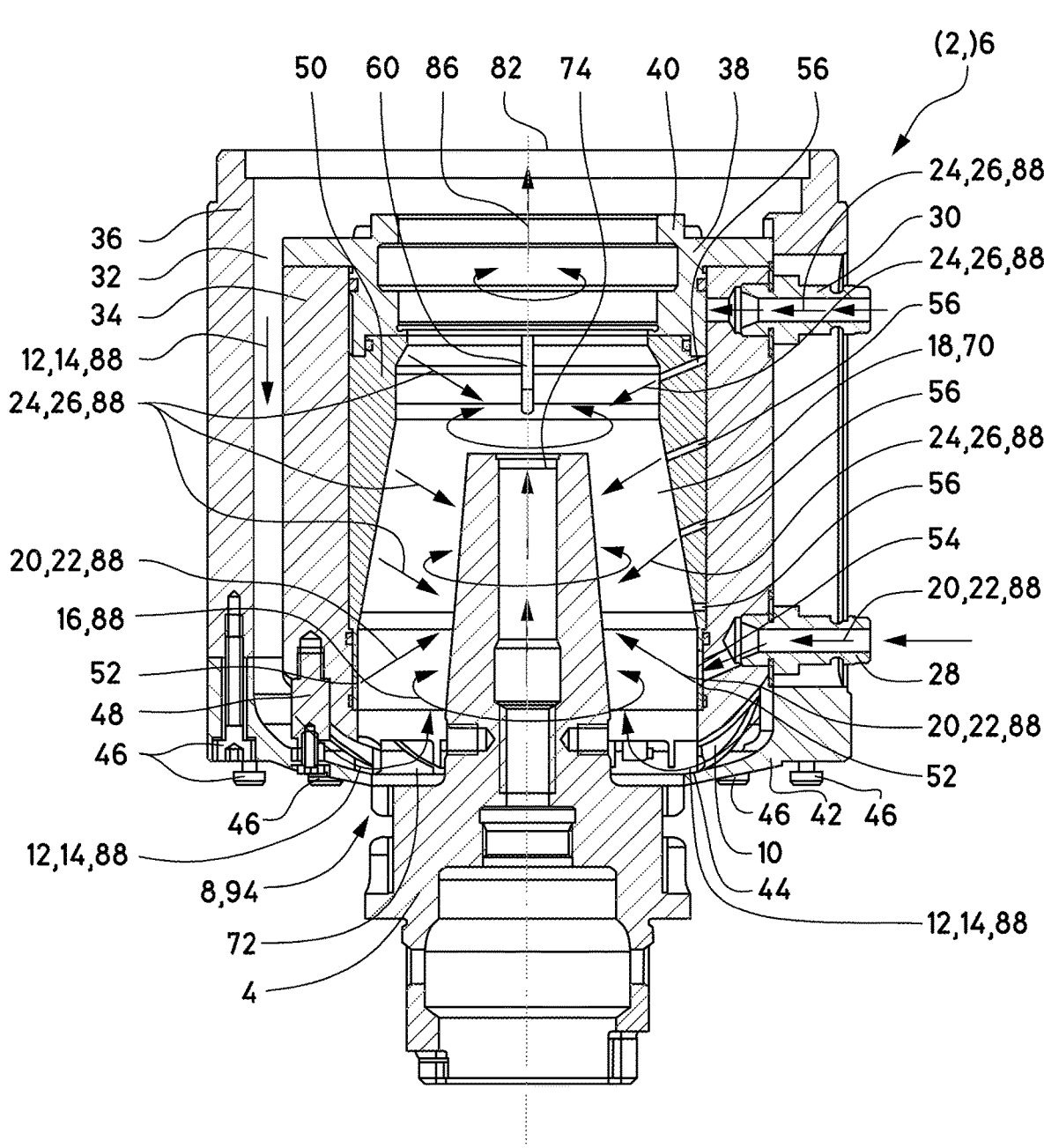
FIG. 3 is a sectional view of the cooling attachment of the apparatus for cooling and/or drying a shrink chuck from FIG. 1, which explains a second phase of a cooling and drying process of the shrink chuck, which is received in the cooling attachment, according to the first embodiment.
Figure 4:
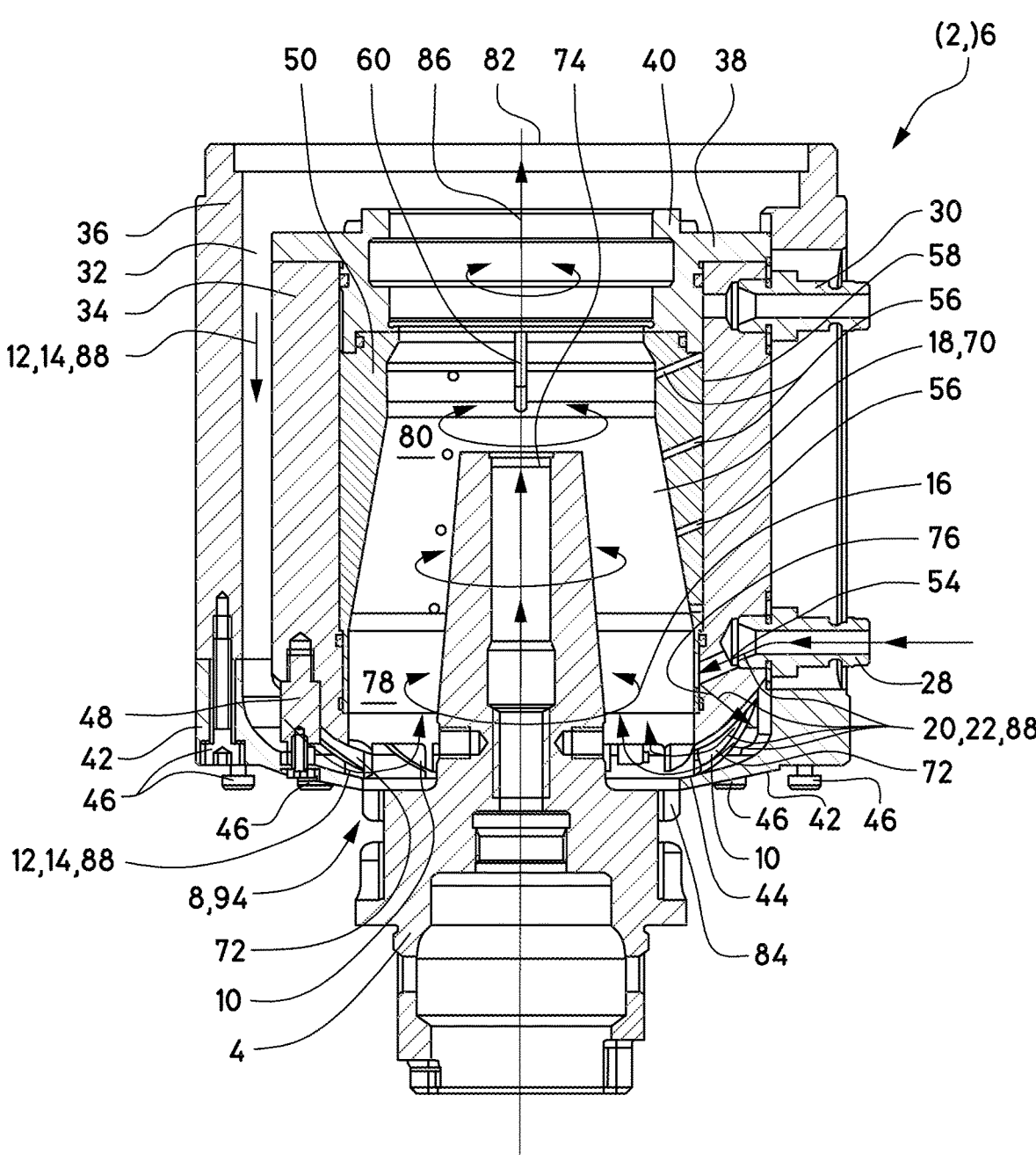
FIG. 4 is a sectional view of the cooling attachment of the apparatus for cooling and/or drying a shrink chuck from FIG. 1, which explains a first phase of a cooling process of a shrink chuck, which is received in the cooling attachment, according to a second embodiment.
Figure 5:
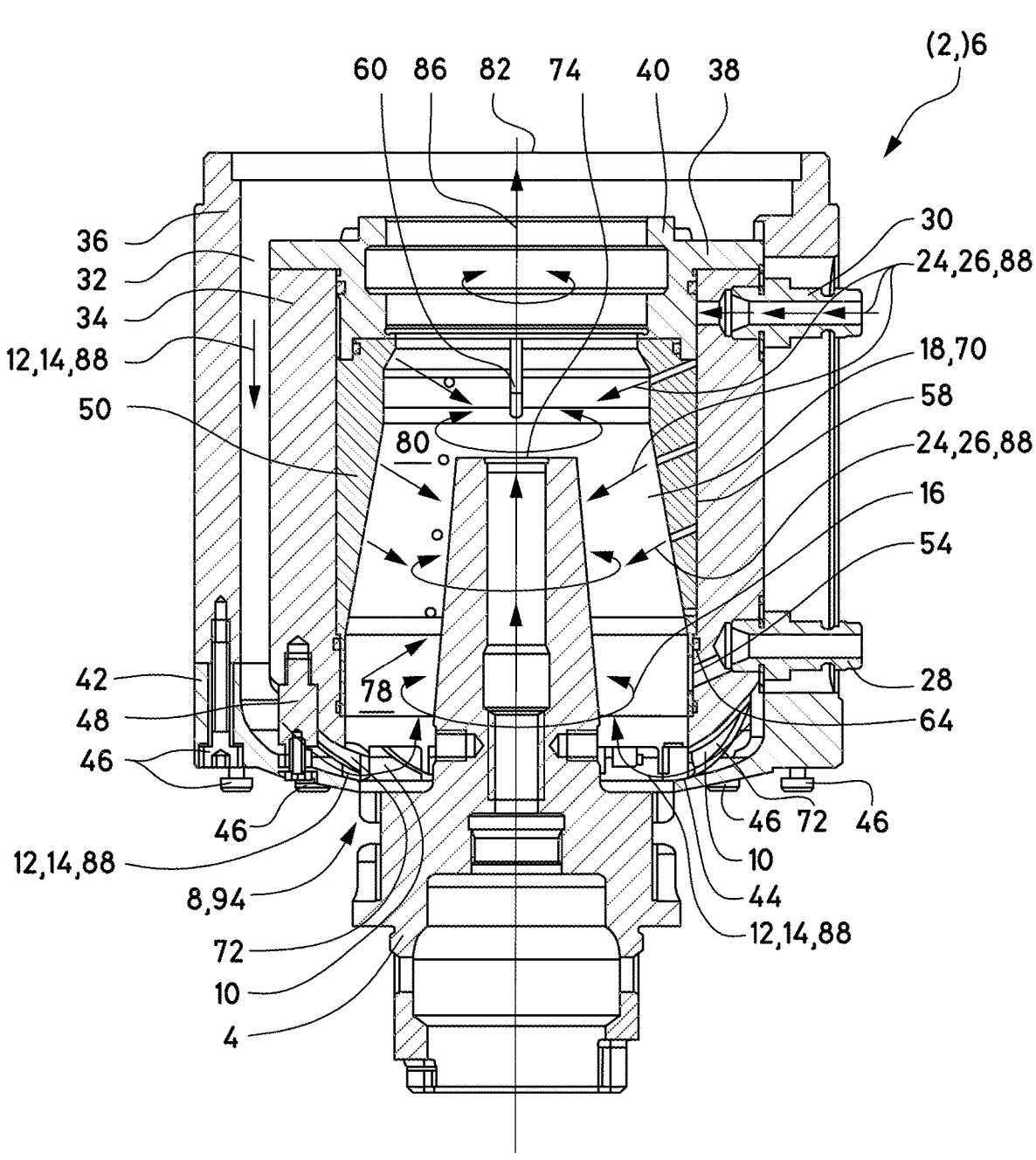
FIG. 5 is a sectional view of the cooling attachment of the apparatus for cooling and/or drying a shrink chuck from FIG. 1, which explains a second phase of a cooling and drying process of the shrink chuck, which is received in the cooling attachment, according to the second embodiment.

In this case, FIGS. 2 and 3 explain in this regard a first cooling process (including a drying process) with two phases (FIG. 2 (phase 1) and FIG. 3 (phase 2)); FIGS. 4 and 5 explain—with a structurally slightly modified apparatus 2—an alternative second cooling process (including a drying process) also with two phases (FIG. 4 (phase 1) and FIG. 5 (phase 2)).

Figure 1:
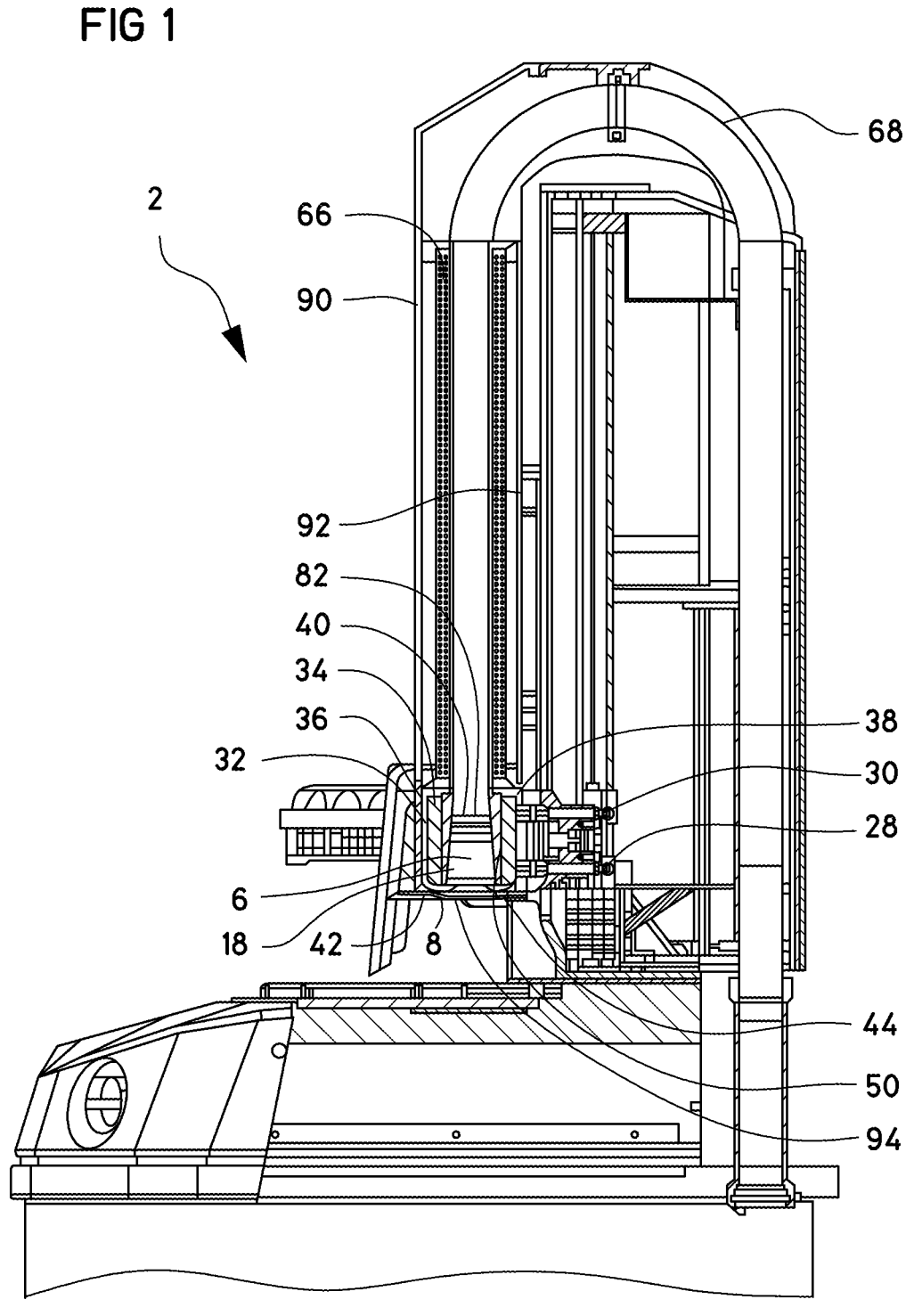
FIG. 1 is a diagrammatic, sectional side view of an apparatus for cooling and/or drying a shrink chuck as a partially sectioned side view.

The apparatus 2 illustrated in FIG. 1 for cooling and/or drying a shrink chuck 4 contains a cooling attachment 6 which is guided displaceably on a frame 92 or stand 92 (vertically in a downward direction or vice versa) and which can thus be fitted in a downward direction over the component, which is intended to be cooled, of the shrink chuck 4, a suction pipe 66 which is connected to the cooling attachment 6 (for cooling fluid 14, 22, 26) which is intended to be discharged from the interior 18 of the cooling attachment 6 and a supply line 90 which is connected to the cooling attachment 6 and which surrounds the suction pipe 66 concentrically from the outer side (for cooling fluid 14 which is intended to be supplied to the cooling attachment 6).

That is to say, the cooling attachment 6 is fitted—for cooling and/or drying the shrink chuck 4—with a fitting opening 94 which is located at the lower end 8 thereof over the shrink chuck 4, more specifically downward from the tool receiving opening 74 thereof, whereby the shrink chuck 4 is introduced from above or from the upper end thereof into the interior 18 of the cooling attachment 6 and is received thereby.

The suction pipe 66 which is connected to the cooling attachment 6 is connected via a suction line 68 which is in the form of a hose or stable pipe to a suction unit which is not illustrated here, whereby cooling fluid 14, 22, 26 can be discharged from the interior 18 of the cooling attachment 6.

The supply line 90, which is connected again to the cooling attachment 6, guides the cooling fluid 14, 22, 26 which is discharged from the cooling attachment 6 back to the cooling attachment again from the suction unit, as illustrated in FIG. 1, where applicable via a drying apparatus and/or cleaning apparatus (not illustrated, for example, may be in a form according to DE 10 2012 002 596 A1).

Figure 6:
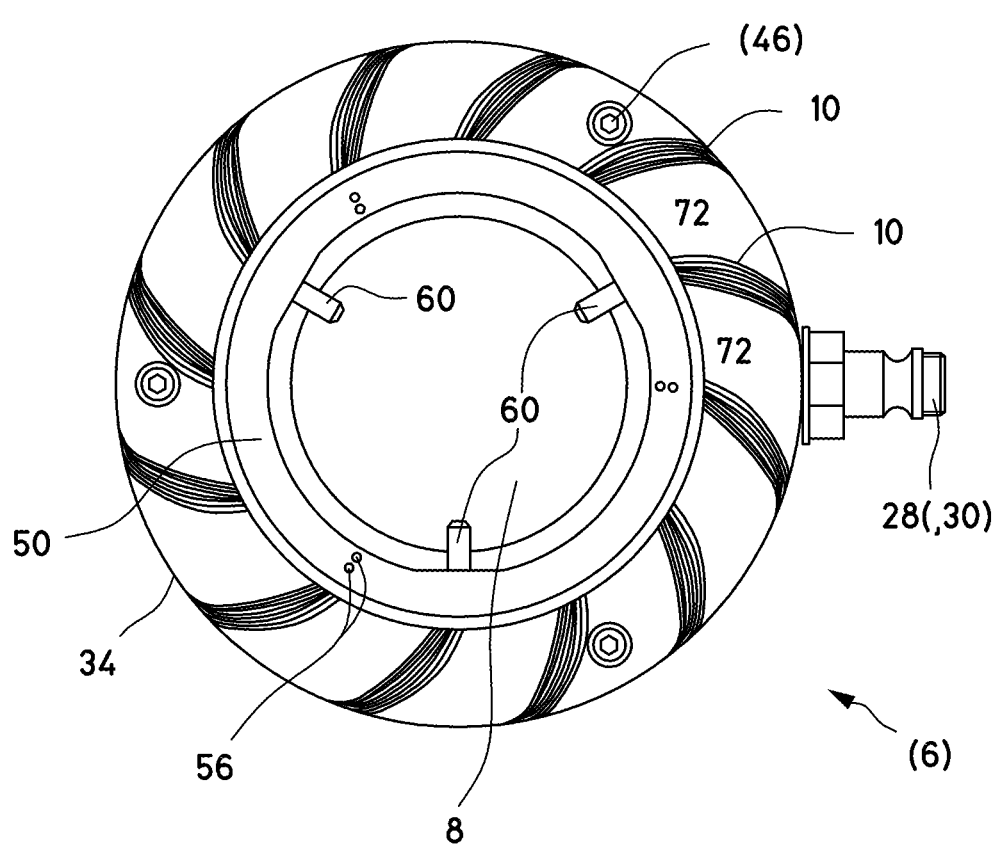
FIG. 6 is a illustration of guiding elements, which produce a turbulent flow, of the cooling attachment of the apparatus for cooling and/or drying a shrink chuck from FIG. 1.

The cooling attachment 6 which is explained in greater detail below (cf. FIGS. 2 to 3 (first embodiment) and FIGS. 4 to 5 (second embodiment) and FIG. 6) contains the already-mentioned fitting opening 94 and the interior 18 which receives the shrink chuck 4 and the inner contour of which is adapted to the outer contour of the component, which is intended to be cooled, of the shrink chuck 4 so that during the fitting of the cooling attachment 6 over the shrink chuck 4 a gap 70 in the interior 18 of the cooling attachment 6 remains in the direction toward the outer face of the shrink chuck 4.

In this case, the inner contours of the fitting opening 94 and the interior 18 of the cooling attachment 6 have such dimensions that a great range of shrink chucks can be cooled, particularly with regard to the diameter and length thereof.

Via the suction line 68, the suction pipe 66 and the cooling attachment 6, cooling fluid 14 or 14, 22 can thus be drawn in or discharged at a lower end 8 of the cooling attachment 6 or at the fitting opening 94 of the cooling attachment 6 and in the interior 18 of the cooling attachment 6, and thus guided via the gap 70 along the outer face of the shrink chuck 4 for the cooling thereof (cf. FIGS. 2 to 5).

If the cooling fluid 14, 22, 26 which is discharged by the suction unit, where applicable dried and/or cleaned, is then supplied—via the corresponding supply line 90—to the cooling attachment 6 again, an efficient, closed cooling circuit can thus be formed.

As particularly FIGS. 2 to 5 and FIG. 6 show, the cooling attachment 6 has the following significant structural components:

an outer housing 36, an inner housing 34 which is arranged in the outer housing 36, a plurality of guiding elements 10 which are integrally formed on the lower end of the inner housing 34 (in the form of curved guiding vanes 10), an insert 50 which is received in the inner housing 34 and which has first and second nozzle-like inlet openings 52, 56 (cf. FIGS. 2 and 3 (first embodiment)) or only second nozzle-like inlet openings 56 (cf. FIGS. 4 and 5 (second embodiment)), a (an upper) cover 38 which is arranged at the upper end of the inner housing 34 and a (lower) cover 42 which is arranged at the lower end of the outer housing 36 and which is retained with the outer housing 36 directly and by means of spacers 48 with spacing in a state screwed 46 to the inner housing 34.

As the figures depicted show, the inner housing 34 is received in the outer housing 36 in such a manner that between the outer housing 36 and the inner housing 34 an annular chamber 32, in this case an incompletely extending annular chamber 32), is formed for a first cooling fluid flow 12 from a first cooling fluid 14.

As the figures depicted also show, if the guiding elements/vanes 10 are further arranged or formed integrally at the lower end of the inner housing 34 of the cooling attachment 6 (cf. in this instance, particularly also FIG. 6), flow-guiding flow regions/spaces 72 are thus formed between the guiding elements 10—and covered at both sides by the inner housing 34 and the (lower) cover 42 which is connected to the outer housing 36, that is to say, screwed 46 in this case.

Thus, if the first cooling fluid flow 12 or the first cooling fluid 14 which flows in the annular chamber 32 flows through these flow regions/spaces 72 (at the lower end 8 of the cooling attachment 6), it is redirected at that location via the guiding elements 10 or guiding vanes 10 and flows from there directly—forming a turbulent flow 16—into the interior 18 of the cooling attachment 6.

In this case, FIG. 1 shows that the supply line 90 which comes from the suction unit is flange-mounted at the upper end of the outer housing 36 so that the discharged, where applicable dried and/or cleaned, cooling fluid 14, 22, 26 can be introduced/flow into the annular chamber 32 as the first cooling fluid flow 12 or the first cooling fluid 14.

FIG. 1 also shows that the suction pipe 66 which leads to the suction unit can be flange-mounted on a flange 40 on the upper cover 38 so that cooling fluid 14, 22, 26 can be discharged out of the interior 18 of the cooling attachment 6.

Furthermore, the depicted figures show how the inner insert 50 is arranged in the inner housing 34, wherein a first annular space 54 (which is formed in a completely circumferential manner in this case) for a second cooling fluid flow 20 out of a second cooling fluid 22) and—above the first annular space 54—a second annular space 58 (which is formed in a completely circumferential manner in this case) for a third cooling fluid flow 24 out of a third cooling fluid 28 are formed—as shown—between the insert 60 and the inner housing 34 in a manner covered by the upper cover 38.

The first and second annular spaces 54, 58 are sealed "outwardly" and also with respect to each other by means of seals 64—which are also illustrated in FIGS. 2 to 5.

As FIGS. 2 and 3 also show, the insert 50 (in the first embodiment thereof ("first insert" for short)) makes provision for, in the lower region 78 thereof first upwardly directed, nozzle-like inlet openings 52 for the introduction or the supply of the second cooling fluid flow 20 or the second cooling fluid 22 from the first annular space 54 into the interior 18 of the cooling attachment 6, and in the upper region 80 thereof second, downwardly directed, nozzle-like inlet openings 56 for the introduction or the supply of the third cooling fluid flow 24 or the third cooling fluid 26 from the second annular space 58 into the interior 18 of the cooling attachment 6.

As the depicted figures show, the second (downwardly directed) inlet openings 56 are uniformly distributed around the circumference (pitch 120°) at different axial heights, in this instance four. There is provided for the first (upwardly directed) inlet openings 52 only one axial height, at which (three) inlet openings 52 are also arranged circumferentially in a uniformly distributed manner.

It is thus possible to bring about a situation in which the second cooling fluid 22 is introduced out of the first annular space 54 via these first inlet openings 52 into the interior 18 of the cooling attachment 6 or in which the third cooling fluid 26 is introduced out of the second annular space 58 via these second inlet openings 56 into the interior 18 of the cooling attachment 6.

As FIGS. 4 and 5 show, the insert 50 also provides (in the second embodiment thereof ("second insert" for short)) in the upper region 80 thereof here the second downwardly directed inlet opening(s) 56 for the introduction or supply of the third cooling fluid flow 24 or the third cooling fluid 26 from the second annular space 58 into the interior 18 of the cooling attachment 6.

However, instead of the first inlet openings 52, the insert 50 according to the second embodiment provides holes 76 in the inner housing 34 which connect the first annular space 54 in technical fluid teems to the flow spaces/regions 72 which are constructed between the guiding elements/vanes 10.

Thus, in this—second—case, is possible to bring about a situation in which the second cooling fluid 22 is initially introduced into the flow spaces/regions 72 out of the first annular space 54 via these holes 76, is thereby redirected and—as a turbulent flow 16 (as is already the first cooling fluid flow 12 or the first cooling fluid 14)—is introduced into the interior 18 of the cooling attachment 6. An identical feature of this second embodiment is that the third cooling fluid 26—as in the first embodiment—can be introduced out of the second annular space 58 via the second inlet openings 56 (directly) into the interior 18 of the cooling attachment 6.

That is to say, in the cooling attachment 6 set out here, with the two constructed inserts 50 thereof, three cooling fluid flows 12, 20, 24 can be produced for cooling and/or drying a shrink chuck 4, that is to say, the first, second and third cooling fluid flow 12, 20, 24 from the first, second or third cooling fluid 14, 22, 26.

As FIGS. 2 to 5 also show, the cooling attachment 6 provides two connections 28, 30 (including respective connection extension pieces) (for the second cooling fluid 22 or the third cooling fluid 26), via which the second cooling fluid 22 can be supplied from the exterior to the first annular space 54 or the third cooling fluid 26 can be supplied from the exterior to the second annular space 58.

These two connections 28, 30 are arranged in the region of this portion of the outer housing 36, in which the annular chamber 32 is not circumferential, lead here through the outer housing 36 and extend through the inner housing 34 (in the region of the first annular space 54 or second annular space 58).

Furthermore, FIGS. 2 to 5 also show that in the region of the lower end 8 of the cooling attachment 6, a sealing element 44, in this instance a sealing lip 44 (with a sealing lobe (not shown)) is arranged for sealing abutment against the shrink chuck 4, in a state integrally formed on the lower cover 42 of the cooling attachment 6 and forming the fitting opening 94 of the cooling attachment 6.

If the cooling attachment 6, during cooling of the shrink chuck 4, in particular is then completely positioned on the shrink chuck 4 by means of the sealing element 44, an otherwise present, outwardly open gap between the lower end 8 of the cooling attachment 6 and the shrink chuck 4 is sealed, and no cooling fluid can be introduced (in an uncontrolled manner and with associated high noise generation) via such a gap from the exterior between the lower end 8 of the cooling attachment 76 and the shrink chuck 4 into the interior 18 of the cooling attachment 6.

As FIGS. 2 to 6 further show, the cooling attachment 6 provides—in this case three—stop elements 60, which are arranged on the insert 50, in the interior 18 of the cooling attachment 6, which can be stopped against the shrink chuck 4.

By means of these stop elements 60, a fitting depth can be adjusted in shrink chucks 4 which are intended to be cooled, or in the case of narrow and/or long shrink chucks 4 which are intended to be cooled—the cooling attachment 6 which is fitted over such a shrink chuck 4 can be prevented from being fitted over the shrink chuck 4 which is intended to be cooled in an uncontrolled manner and/or too far, because there is no reachable support on the shrink chuck 4, for example, a collar 84 of the shrink chuck 4.

Cooling and Drying Process (with First Insert 50)—Variant 1

FIGS. 2 and 3 explain—in particular with arrows 88 which are depicted therein and which explain flow directions 88—a first two-phase cooling and drying process in the shrink chuck 4. The first cooling and drying process provides the apparatus 2 with the first insert 50.

In the first phase, which is explained in greater detail in FIG. 2, of this process, the first cooling fluid flow 12 or the first cooling fluid 14, in this case a/the (blast) air 14 which is located in the closed process and which may be dried and/or cleaned where applicable, is introduced out of the annular chamber 32—via the guiding elements 10 at the lower end 8 of the cooling attachment 6 or flow spaces/ regions 72 at that location—forming the turbulent flow 16—into the interior 18 of the cooling attachment 6 and flows around (in a manner brought about by the discharge) the shrink chuck 4 on a helical path or with a helically turbulent movement (88)) in a state drawn off upward.

At the same time, the second cooling fluid flow 20 or the second cooling fluid 22, in this case a pressurized water/air admixture 22, is introduced—in a manner supplied via the corresponding connection 28 thereof to the first annular space 54—via the upwardly directed first inlet openings 52 into the interior of the cooling attachment 6 (88).

The application of flow to the shrink chuck 4 with the second cooling fluid 22 or the second cooling fluid flow 20 is thus carried out initially by a laminar flow (88) which is directed obliquely upwardly and which then over the continued path becomes mixed with the first cooling fluid flow 12 or is carried along by the turbulent flow 16 of the first cooling fluid 14.

Via the discharge by the suction unit, the two mixed cooling fluid flows 12, 20 or cooling fluids 14, 22 leave the interior 18 of the cooling attachment 6 at the upper end 82 thereof through the suction pipe 66.

Via the suction unit and via the supply line 90, this flow (88) is introduced—where applicable in a dried and/or cleaned state—as a first cooling fluid flow 12 into the annular chamber 32 again, whereby the circuit is thus closed.

If a predeterminable cooling degree is reached in the shrink chuck, the first phase of the process is finished in that in the now starting second process phase, which is explained in FIG. 3, instead of the water/air admixture 22 (blast) air 22 (where applicable also under pressure) is introduced as the second cooling fluid 22 or the second cooling fluid flow 20 via the upwardly directed first inlet openings 52.

That is to say, if, after the first phase, the water/air admixture which cools effectively and efficiently—is switched off and replaced by (blast) air, liquid residues which may still be present on the shrink chuck can be blown away by such (blast) air—which increases the drying power in the second phase.

At the same time, in this second phase the third cooling fluid flow 24 or the third cooling fluid 26, in this case also (blast) air 26 (where applicable also under pressure) is now introduced—in a manner supplied to the second annular space 58 via the corresponding connection 30 thereof—via the downwardly directed second inlet openings 56 into the interior 18 of the cooling attachment 6.

In this second phase, the flow application (88) of the shrink chuck 4 is also carried out with the first cooling fluid flow 12, also in this case again out of the (blast) air 14 which is where applicable dried and/or cleaned and which is located in the closed process.

That is to say, the first cooling fluid flow 12 or the first cooling fluid 14 flows in the turbulent flow 18 into the interior 18 of the cooling attachment 6 out of the annular chamber 32—in a manner redirected and deflected via the guiding elements 10 at the lower end 8 of the cooling attachment 6 or flow spaces/regions 72 at that location, forming the turbulent flow 18, where it is then discharged upwardly on the helical path or with a helically turbulent movement (88).

If the flow application is carried out against the shrink chuck with the second cooling fluid 22 or the second cooling fluid flow 20, initially by an obliquely upwardly directed laminar flow (88) or the application of flow against the shrink chuck 4 with the third cooling fluid 26 or the third cooling fluid flow 24 initially by an obliquely downwardly directed laminar flow (88), the second cooling fluid flow 20 and the third cooling fluid flow 24 then become mixed in the continuing path with the first cooling fluid flow 12 or are carried along by the turbulent flow 18 of the first cooling fluid 14.

The three mixed cooling fluid flows 12, 20, 24 or cooling fluids 14, 22, 26 leave via the discharge by the suction unit the interior 18 of the cool attachment 6—at the upper end 82 thereof through the suction pipe 66.

Via the suction unit and via the supply line 99, this flow—where applicable in a state dried and/or cleaned—is again introduced as the first cooling fluid flow into the annular chamber 32, whereby the circuit is thus closed.

The cooling and drying process (with a second insert 50)—variant 2 is now further described.

FIGS. 4 and 5 explain—in particular with arrows 88 which are depicted therein and which explain flow directions 88—a first two-phase cooling and drying process in a shrink chuck 4. This second cooling and drying process provides the apparatus 2 with the second insert 50.

In the first phase, which is explained in greater detail in FIG. 4, of this process, the first cooling fluid flow 12 or the first cooling fluid 14, in this case the (blast) air 14 which is located in the closed process and which may be dried and/or cleaned where applicable, is also introduced out of the annular chamber 32—via the guiding elements 10 at the lower end 8 of the cooling attachment 6 or flow spaces/ regions 10 at that location—forming the turbulent flow 16—into the interior 18 of the cooling attachment 6 and flows around (in a manner brought about by the discharge) the shrink chuck 4 on a helical path or with a helically turbulent movement (88) in a state discharged upward.

At the same time, the second cooling fluid flow 20 or the second cooling fluid 22, in this case also the pressurized water/air admixture 22, is introduced—in a manner supplied via the corresponding connection 28 thereof to the first annular space 54 and guided onward via the holes 76 in the inner housing 34—via the flow spaces/regions 72 into the interior 18 of the cool attachment 6.

In this case, the first cooling fluid flow 12 and the second cooling fluid flow 20 or the first cooling fluid 12 and the second cooling fluid 22 already become mixed in the region of the flow spaces/regions 72, whereby the second cooling fluid 22 (in a state mixed with the first cooling fluid 14) also flows into the interior 18 of the cooling attachment 6, forming the turbulent flow 16, and continue to flow round the shrink chuck 4 at that location (in a manner brought about by the discharge) on a helical path or with helically turbulent movement (88).

The two mixed cooling fluid flows 12, 20 or cooling fluids 14, 22 leave the interior 18 of the cooling attachment 6 via the discharge, at the upper end 82 thereof through the suction pipe 66.

Via the suction unit and via the supply line 90, this flow is introduced—where applicable in a dried and/or cleaned state—as a first cooling fluid flow 12 into the annular chamber 32 again, whereby the circuit is thus closed.

If a predeterminable cooling degree is reached in the shrink chuck 4, the first phase of the process is finished in that in the now starting second process phase, which is explained in FIG. 5, the third cooling fluid flow 24 or the third cooling fluid 26, in this case also (blast) air 26 (where applicable also under pressure), is introduced, in a manner supplied via the corresponding connection 30 thereof to the second annular space 58, via the downwardly directed second inlet openings 56 into the interior 18 of the cooling attachment 6.

That is to say, if, after the first phase, the water air admixture—which cools effectively and efficiently—of the second cooling fluid 22 is (completely) switched off and replaced by (blast) air of the third cooling fluid 26, liquid residues which may still be present on the shrink chuck can be blown away by such (blast) air—which increases the drying power in the second phase.

In this second phase, the flow application against the shrink chuck 4 is also carried out with the first cooling fluid flow 24 or the first cooling fluid 14, also in this case again out of the (blast) air 14 which is where applicable dried and/or cleaned and which is located in the closed process.

That is to say, the first cooling fluid flow 12 or the first coding fluid 14 flows in the turbulent flow 16 into the interior 18 of the coding attachment 6 out of the annular chamber 32—in a manner redirected and deflected via the guiding elements 10 at the lower end 8 of the cooling attachment 6 or flow spaces/regions 72 at that location, and forming the turbulent flow 16, where it is then discharged upwardly on the helical path or with a helically turbulent movement (88).

If the flow application is carried out against the shrink chuck 4 with the third cooling fluid 26 or the third cooling fluid flow 24, initially by an obliquely upwardly directed laminar flow, the third cooling fluid flow 24 then becomes mixed in the continuing path with the first coding fluid flow 12 or they are carried along by the turbulent flow 16 of the first coding fluid 14.

The two mixed cooling fluid flows 12, 24 or cooling fluids 14, 26 leave via the discharge by the suction unit the interior 18 of the coding attachment 6—at the upper end 82 thereof through the suction pipe 66.

Via the suction unit and via the supply line 90, this flow—where applicable in a state dried and/or cleaned—is again introduced as the first cooling fluid flow 12 into the annular chamber 32, whereby the circuit is thus closed.

The depicted figures also show that in the described processes external air can also be or is drawn in (88) through the interior of the shrink chuck 4, which air is thus introduced—through the shrink chuck 4—into the interior 18 of the cooling attachment 6 at the tool receiving opening 74 thereof, becomes mixed there with the other cooling fluid flows 12, 20, 24, and together therewith is discharged out of the interior 18 of the cooling attachment 6 by means of the suction unit.

Irrespective of the above, the cooling and drying process can also be carried out as a simple drying process, wherein here all the cooling fluids which flow against the shrink chuck are then "pure" (blast) air or generally dry liquid-free fluids.

Although the invention has been illustrated and described in greater detail by the preferred embodiments, the invention is not limited by the disclosed examples and other variations can be derived therefrom without departing from the protective scope of the invention.

The following is a summary list of reference numerals and the corresponding structure used in the above description of the invention.

LIST OF REFERENCE NUMERALS

2 Apparatus for cooling and/or drying a shrink chuck
4 Shrink chuck, tool holder
6 Cooling attachment (which can be fitted over)
8 Lower end of the cooling attachment
10 Guiding element, guiding vane (integrally formed on the inner housing)

12 First cooling fluid flow
14 First cooling fluid
16 Turbulent flow
18 Interior of the cooling attachment
20 Second cooling fluid flow
22 Second cooling fluid
24 Third cooling fluid flow
26 Third cooling fluid
28 First connection/extension piece (for second cooling fluid)
30 Second connection/extension piece (for third cooling fluid)
32 Annular chamber (between inner and outer housing for first cooling fluid/first cooling fluid flow)
34 Inner housing
36 Outer housing
38 Upper cover (for/on inner housing)
40 Flange (on upper cover for suction pipe)
42 Lower cover (for/on outer housing)
44 Sealing element, sealing lip, sealing lobe
46 Screw, screw connection
48 Spacer
50 Insert (with first/second) inlet openings
52 First (upwardly directed) inlet opening(s)
54 First (lower) annular space (for second cooling fluid/ second cooling fluid flow)
56 Second downwardly directed) inlet opening(s)
58 Second (upper) annular space (for third cooling fluid/ third cooling fluid flow)
60 Stop element(s)
64 Seal (for the annular spaces)
66 Suction pipe
68 Suction line
70 Gap
72 Flow space (formed between two guiding elements/ vanes (redirecting and generating the turbulent flow)
74 Tool receiving opening (of the tool holder/shrink chuck)
76 Hole (in the inner housing 34)
78 Lower region (of insert 50)
80 Upper region (of insert 50)
82 Upper end (of cooling attachment)
84 Collar (on shrink chuck/tool holder 4)
86 Longitudinal axis (of insert)
88 Flow direction/arrow
90 Supply line/pipe
92 Frame, stand
94 Fitting opening

The invention claimed is:

1. An apparatus for cooling and/or drying a shrink chuck, the apparatus comprising:
a cooling attachment having an interior and a lower end to be fitted over the shrink chuck and the shrink chuck being received in said interior, said cooling attachment in a region of said lower end having guiding elements disposed and constructed such that a first cooling fluid flow is guided into said interior, and a turbulent flow of the first cooling fluid flow being produced and brought about by said guiding elements.

2. The apparatus for cooling and/or drying the shrink chuck according to claim 1, wherein said cooling attachment has an outer housing and an inner housing which is disposed in said outer housing, wherein between said outer housing and said inner housing an annular chamber or an incompletely circumferential annular chamber for the first cooling fluid flow is constructed.

3. The apparatus for cooling and/or drying the shrink chuck according to claim 2, wherein said cooling attachment has an insert which is disposed in said inner housing.

4. The apparatus for cooling and/or drying the shrink chuck according to claim 3, wherein said insert has a first upwardly directed inlet opening formed therein for a second cooling fluid flow and/or a second downwardly directed inlet opening formed therein for a third cooling fluid flow.

5. The apparatus for cooling and/or drying the shrink chuck according to claim 3, wherein said cooling attachment has a first annular space constructed between said insert and said inner housing for a second cooling fluid flow, and/or a second annular space for a third cooling fluid flow.

6. The apparatus for cooling and/or drying the shrink chuck according to claim 2, wherein said cooling attachment has an insert disposed in said cooling attachment or in said inner housing so as to be able to be rotated about a longitudinal axis thereof.

7. The apparatus for cooling and/or drying the shrink chuck according to claim 6, wherein:
said insert is disposed in said inner housing of said cooling attachment;
said insert has a lower region and in said lower region has a first upwardly directed inlet opening formed therein for a second cooling fluid flow; and
said insert has an upper region and in said upper region a second downwardly directed inlet opening is formed therein for a third cooling fluid flow.

8. The apparatus for cooling and/or drying the shrink chuck according to claim 2, wherein said inner housing of said cooling attachment has holes formed therein which connect a first annular space to a flow space in a region of said guiding elements in technical fluid terms.

9. The apparatus for cooling and/or drying the shrink chuck according to claim 2, wherein said guiding elements are integrally formed on said inner housing of said cooling attachment.

10. The apparatus for cooling and/or drying the shrink chuck according to claim 2, further comprising a suction pipe and/or a suction line is/are disposed on said inner housing of said cooling attachment.

11. The apparatus for cooling and/or drying the shrink chuck according to claim 2, wherein said inner housing of said cooling attachment has holes formed therein which connect a first annular space to a flow space in a region of said guiding elements, said holes are formed between said guiding elements and/or in a flow direction of said guiding elements, in technical fluid terms.

12. The apparatus for cooling and/or drying the shrink chuck according to claim 1, further comprising a suction pipe and/or a suction line is/are disposed at an upper end of said cooling attachment.

13. The apparatus for cooling and/or drying the shrink chuck according to claim 1, further comprising a sealing element, a sealing lip or a sealing lobe disposed in a region of said lower end of said cooling attachment for sealing abutment against the shrink chuck.

14. The apparatus for cooling and/or drying the shrink chuck according to claim 1, wherein said cooling attachment has at least one supply line, through which a cooling fluid is supplied into a flow space in a region of said guiding elements.

15. The apparatus for cooling and/or drying the shrink chuck according to claim 1, further comprising stop elements which are able to stop against the shrink chuck are disposed on said cooling attachment.

16. The apparatus for cooling and/or drying the shrink chuck according to claim 1, wherein said cooling attachment has at least one supply line, through which a cooling fluid is suppled into a flow space in a region of said guiding elements, the cooling fluid being supplied between said guiding elements and/or in a flow direction upstream of said guiding elements.

17. A method for cooling and/or drying a tool holder, which comprises the steps of:

cooling and/or drying the tool holder by a first cooling fluid flow from a first cooling fluid, wherein the first cooling fluid flow flows in a form of a turbulent flow axially in a direction of a tool receiving opening of the tool holder along the tool holder.

18. The method for cooling and/or drying the tool holder according to claim 17, which further comprises:

cooling or drying the tool holder by a second cooling fluid flow from a second cooling fluid, wherein the tool holder is blown on by the second cooling fluid flow in a form of an upwardly directed flow or in that the second cooling fluid flow in a form of the turbulent flow also flows axially in the direction of the tool receiving opening of the tool holder along the tool holder.

19. The method for cooling and/or drying the tool holder according to claim 18, which further comprises cooling and/or drying the tool holder by a third cooling fluid flow from a third cooling fluid, wherein the tool holder is blown on by the third cooling fluid flow in a form of a downwardly directed flow.

20. The method for cooling and/or drying the tool holder according to claim 19, wherein the first cooling fluid, the second cooling fluid and/or the third cooling fluid of the first cooling fluid flow, the second cooling fluid flow and/or the third cooling fluid flow, respectively, is/are air or a gas or a water/air admixture or an air/gas admixture.

21. The method for cooling and/or drying the tool holder according to claim 20, wherein:

the first cooling fluid of the first cooling fluid flow is air or dried air; and/or the second cooling fluid of the second cooling fluid flow is a water/air admixture or air; and/or the third cooling fluid of the third cooling fluid How is air.

22. The method for cooling and/or drying the tool holder according to claim 19, wherein:

the first cooling fluid flow which cools and/or dries the tool holder is discharged; or the first fluid flow, the second fluid flow and the third fluid flow which cool and/or dry the tool holder are discharged.

23. The method for cooling and/or drying the tool holder according to claim 22, wherein a discharged first cooling fluid flow or discharged first, second and third cooling fluid flows is/are dried and a dried cooling fluid flow is supplied again to a cooling process of the tool holder as the first cooling fluid flow.

24. The method for cooling and/or drying the tool holder according to claim 22, wherein the first fluid flow, the second fluid flow and the third fluid flow which cool and/or dry the tool holder are discharged by means of a suction unit.

25. The method for cooling and/or drying the tool holder according to claim 17, which further comprises:

cooling and/or drying the tool holder in several phases, wherein:

in a first phase of the cooling and/or the drying of the tool holder, the tool holder is cooled and/or dried by means of the first cooling fluid flow and a second cooling fluid flow; and in a second phase of the cooling and/or the drying of the tool holder, the tool holder is cooled and/or dried at least by means of the first cooling fluid flow and a third cooling fluid flow.

26. The method for cooling and/or drying the tool holder according to claim 25, wherein in the second phase of the cooling of the tool holder, the tool holder is further cooled and/or dried by means of the second cooling fluid flow.

27. The method for cooling and/or drying the tool holder according to claim 25, which further comprises mixing and/or combining the first cooling fluid flow and the second cooling fluid flow before the tool holder is subjected to a flow.

28. The method for cooling and/or drying the tool holder according to claim 25, wherein a second cooling fluid of the second cooling fluid flow in the first phase is a water/air admixture and a third cooling fluid of the third cooling fluid flow in the second phase is air.

29. The method for cooling and/or drying the tool holder according to claim 25, wherein at least one of the first cooling fluid flow, the second cooling flow, and the third cooling flow is supplied to the tool holder under pressure.

30. The method for cooling and/or drying the tool holder according to claim 29, wherein the second cooling fluid flow is supplied to the tool holder under pressure at least in a case of a water/air admixture.

31. The method for cooling and/or drying the tool holder according to claim 25, wherein at least one of the second cooling fluid flow or the third cooling fluid flow is also caused to flow as a turbulent flow.

32. The method for cooling and/or drying the tool holder according to claim 17, which further comprises cooling and/or drying the tool holder in several phases.

* * * * *